United States Patent
Zhao (10) Patent No.: US 12,296,727 B2
(45) Date of Patent: May 13, 2025

(54) CHILD SAFETY SEAT AND SIDE WING HEIGHT AND WIDTH ADJUSTMENT MECHANISM THEREFOR

(71) Applicant: WONDERLAND SWITZERLAND AG, Steinhausen (CH)

(72) Inventor: Guanghui Zhao, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 170 days.

(21) Appl. No.: 18/006,117

(22) PCT Filed: Jun. 28, 2021

(86) PCT No.: PCT/CN2021/102810
§ 371 (c)(1),
(2) Date: Jan. 19, 2023

(87) PCT Pub. No.: WO2022/017132
PCT Pub. Date: Jan. 27, 2022

(65) Prior Publication Data
US 2023/0294575 A1   Sep. 21, 2023

(30) Foreign Application Priority Data

Jul. 20, 2020   (CN) .......................... 202010701245.2

(51) Int. Cl.
*B60N 2/28*   (2006.01)
(52) U.S. Cl.
CPC ......... *B60N 2/2872* (2013.01); *B60N 2/2851* (2013.01)
(58) Field of Classification Search
CPC ............................ B60N 2/2851; B60N 2/2872
See application file for complete search history.

(56) References Cited

U.S. PATENT DOCUMENTS

| | | | |
|---|---|---|---|
| 6,030,047 | A | 2/2000 | Kain |
| 2016/0114705 | A1 | 4/2016 | Morgenstern et al. |

(Continued)

FOREIGN PATENT DOCUMENTS

| | | |
|---|---|---|
| CN | 202439584 U | 9/2012 |
| CN | 203601063 U | 5/2014 |

(Continued)

OTHER PUBLICATIONS

Search Report issued in corresponding International Patent Application No. PCT/CN2021/102810 on Oct. 9, 2021, consisting of 6 pp. (English Translation Provided).

(Continued)

*Primary Examiner* — Timothy J Brindley
(74) *Attorney, Agent, or Firm* — Volpe Koenig (57) ABSTRACT

A child safety seat and a side wing height and width synchronous adjustment mechanism therefor. The side wing height and width synchronous adjustment mechanism includes a first guide rail extending in the width direction of a child safety seat, a second guide rail extending in the height direction of the child safety seat, a first fitting guide member in sliding-fit with the first guide rail, and a second fitting guide member in sliding-fit with the second guide rail, wherein the first guide rail is arranged on one of a side wing and an adjustor, and the first fitting guide member is arranged on the other one of the side wing and the adjustor; and the second guide rail is arranged on one of a first backrest and the side wing, and the second fitting guide member is arranged on the other one of the first backrest and the side wing.

26 Claims, 11 Drawing Sheets

(56) References Cited

U.S. PATENT DOCUMENTS

| | | |
|---|---|---|
| 2019/0176662 A1 | 6/2019 | Pleiman |
| 2020/0148079 A1 | 5/2020 | Duan |

FOREIGN PATENT DOCUMENTS

| | | | |
|---|---|---|---|
| CN | 103921705 A | 7/2014 | |
| CN | 203995787 U | 12/2014 | |
| CN | 205674906 U | 11/2016 | |
| CN | 205686224 U | 11/2016 | |
| CN | 205836588 U | 12/2016 | |
| CN | 107791905 A | 3/2018 | |
| CN | 108437859 A * | 8/2018 | ........... B60N 2/2851 |
| CN | 208530351 U | 2/2019 | |
| CN | 208760481 U | 4/2019 | |
| CN | 209683499 U | 11/2019 | |
| DE | 102008002822 A1 | 11/2009 | |
| EP | 2061673 B1 | 3/2013 | |
| EP | 3666589 A1 | 6/2020 | |
| WO | WO-2008031583 A2 * | 3/2008 | ........... B60N 2/2851 |
| WO | 2017148309 A1 | 9/2017 | |

OTHER PUBLICATIONS

Written Opinion issued in corresponding International Patent Application No. PCT/CN2021/102810 on Oct. 9, 2021 consisting of 3 pp.

Office Action issued in corresponding Taiwanese Patent Application No. 110126446 on Apr. 20, 2022, consisting of 10 pp.

Office Action issued in corresponding Taiwanese Application No. 112135189 dated Dec. 21, 2023.

"First Office Action Issued in Corresponding Chinese Patent Application No. 202010701245.2", Mailed Date: Mar. 27, 2024, 16 pages.

Extended Search Report issued in corresponding European Patent Application No. 21845821.4 on Jul. 26, 2024, consisting of 29 pp.

* cited by examiner

FIG.11

CHILD SAFETY SEAT AND SIDE WING HEIGHT AND WIDTH ADJUSTMENT MECHANISM THEREFOR

CROSS-REFERENCE TO RELATED APPLICATIONS

This application is a 371 U.S. National Phase of International Application No. PCT/CN2021/102801, filed on Jun. 28, 2021, which is based on and claims priority to the Chinese patent application No. 202010701245.2, filed on Jul. 20, 2020, and titled "CHILD SAFETY SEAT AND SIDE WING HEIGHT AND WIDTH ADJUSTMENT MECHANISM THEREFOR", the entire contents of which constitute a part of this application and are incorporated herein by reference.

TECHNICAL FIELD

The present disclosure relates to products for children, and in particular to a child safety seat and a side wing height and width adjustment mechanism therefor.

BACKGROUND

With the wide use of baby carriers, there are increasing requirements for the functionality of baby carriers, and it is expected that baby carriers can not only make babies safer and comfortable when the babies are sitting on these carriers, but also be more convenient to operate and use.

The child safety seat is a device installed on a car seat and used to restrain a child thereon by using a restraint device, which can effectively reduce the probability of the child being hurt in the case of emergency braking or accidental collision of the car.

As known, the child safety seat usually includes a seat, a backrest connected to the seat, and a headrest and side wings connected to the backrest. The headrest and the side wings generally can be adjusted with respect to the backrest, so as to adapt to children of different sizes.

SUMMARY

The present disclosure is to provide a side wing height and width synchronous adjustment mechanism arranged on a child safety seat, and the child safety seat includes a first backrest, a second backrest, a headrest, and side wings. The first backrest and the second backrest are slidably connected to each other along a height direction of the child safety seat, the headrest is assembled on the second backrest and, together with the second backrest, forms an adjustor for performing a height adjustment with respect to the first backrest, the side wings are located on sides of the first backrest. The side wing height and width synchronous adjustment mechanism of the present disclosure includes a first guide rail extending in a width direction of the child safety seat, a second guide rail extending in the height direction of the child safety seat, a first fitting guide member in sliding-fit with the first guide rail, and a second fitting guide member in sliding-fit with the second guide rail. The first guide rail is arranged on one of the side wings or the adjustor, the first fitting guide member is arranged on the adjustor or the one of the side wings, the second guide rail is arranged on the first backrest or one of the side wings, and the second fitting guide member is arranged on the one of the side wings or the first backrest. During the height adjustment of the headrest, a height and a width of the side wings are synchronously adjusted in a linkage manner by means of the first fitting guide member sliding on the first guide rail and the second fitting guide member sliding on the second guide rail.

The child safety seat of the present disclosure includes a base, a first backrest, a second backrest, a headrest, side wings, and the aforementioned side wing height and width synchronous adjustment mechanism. The first backrest and the second backrest are slidably connected to each other along a height direction of the child safety seat, the headrest is assembled on the second backrest and, together with the second backrest, forms an adjustor for performing a height adjustment with respect to the first backrest, and the side wings are located on two opposite sides of the first backrest, respectively.

LIST OF REFERENCE SIGNS

100 Child Safety Seat
10 Base
20 First Backrest
21 Height Guiding Track
22 Protruding Strip
221 Segment Locking Part
30 Adjustor
30a Second Backrest
31 Fitting Guide Structure
32 Avoidance Space
30b Headrest
33 Limiting Lug
40 Side Wing
50 Side Wing Height And Width Synchronous Adjustment Mechanism
51 First Guide Rail
52 Second Guide Rail
53 First Fitting Guide Member
54 Second Fitting Guide Member
55 Side Wing Reset Member 56 Unlocking Operating Member
561 Limiting Slotted Hole
57 Locking Member
58 Intermediate Linking Member
58a Driving Chute
581 Inclined Structure
582 Avoidance Space
59 Unlocking Reset Member
A Height Direction
B Width Direction
C Front-Rear Direction

DETAILED DESCRIPTION

Now embodiments of the present disclosure will be described with reference to the accompanying drawings, in which like element numbers represent like elements.

The existing child safety seat can only bring the side wings to be pivoted by adjusting the height of the headrest with respect to the backrest, so as to achieve simultaneous adjustment of the height of the headrest and the width of the side wings. However, such a child safety seat has the following problems: the height of the side wings cannot be adjusted along with the height adjustment of the headrest, leading to poor universality and comfort.

Therefore, there is an urgent need for a child safety seat and a side wing height and width adjustment mechanism therefor with better universality and comfort to overcome the above-mentioned defects.

An objective of the present disclosure is to provide a side wing height and width adjustment mechanism with better universality and comfort.

Another objective of the present disclosure is to provide a child safety seat with better universality and comfort.

Figure 1:
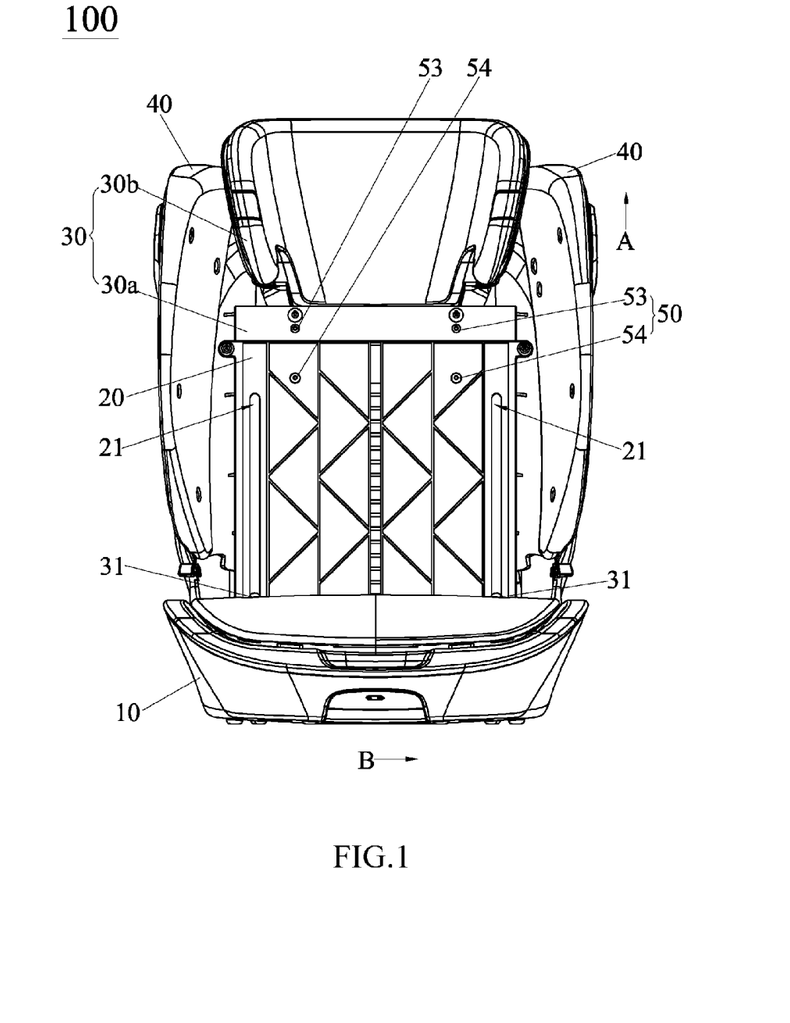
FIG. 1 is a schematic plan structural view of a child safety seat of the present disclosure when it is retracted inward and projected from front to back.
Figure 4:
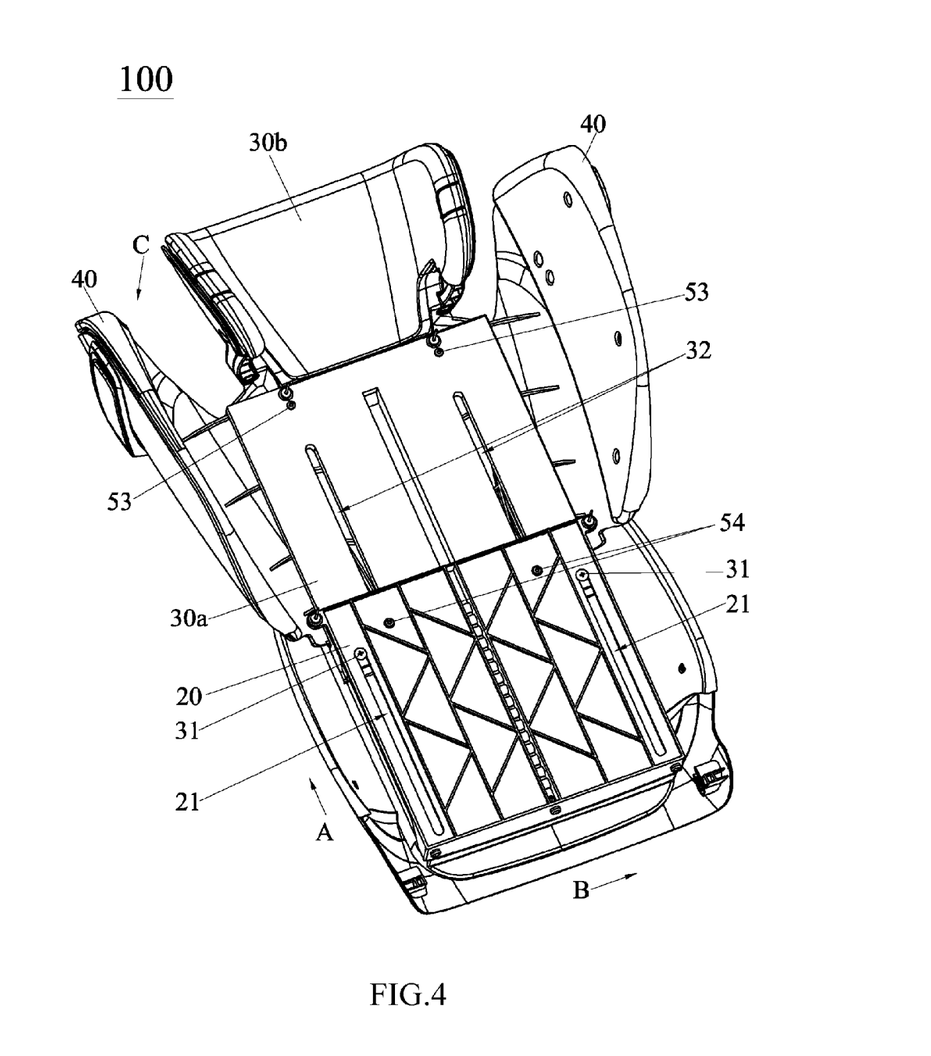
FIG. 4 is a schematic perspective structural view of the child safety seat shown in FIG. 3.
Figure 5:
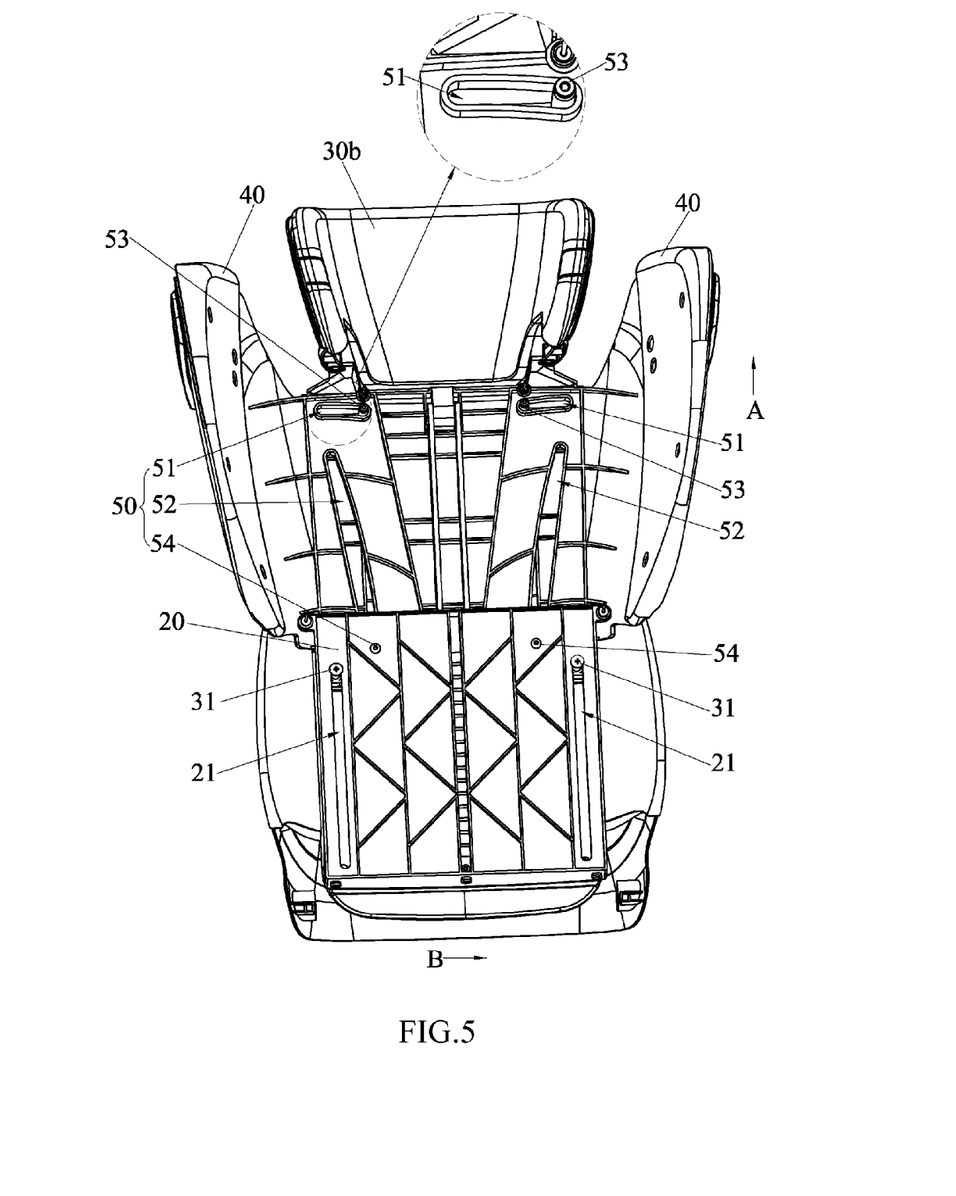
FIG. 5 is a schematic plan structural view of the child safety seat shown in FIG. 3 after a second backrest is hidden.
Figure 6:
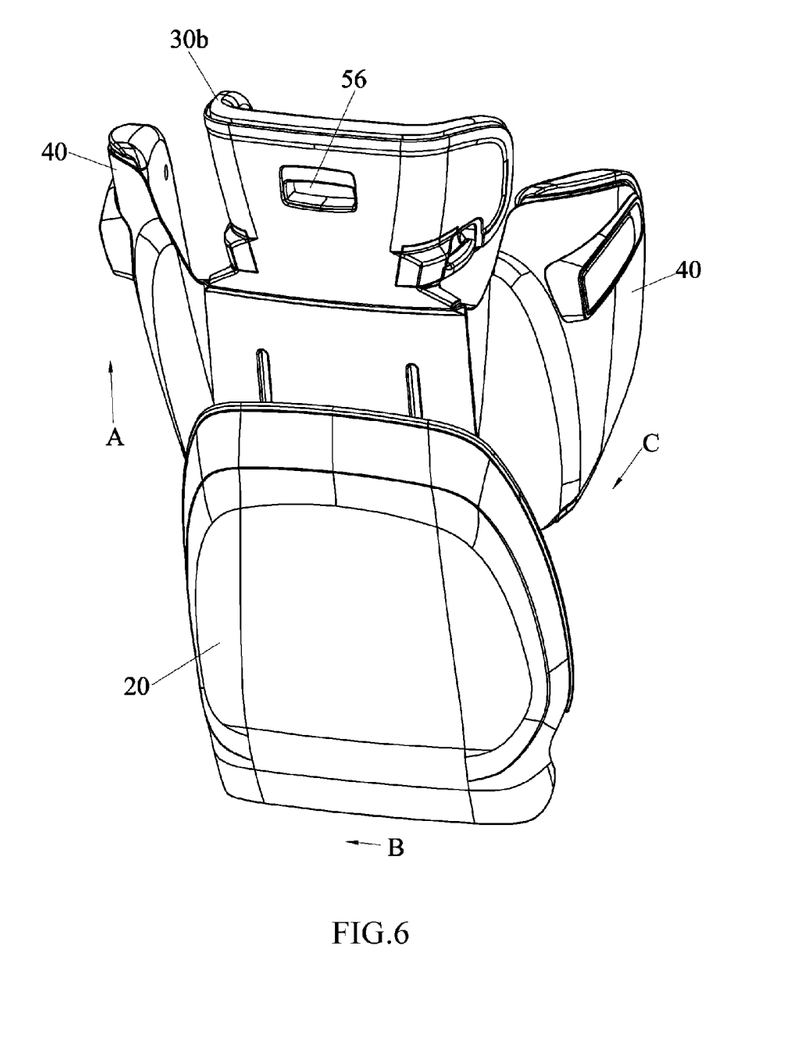
FIG. 6 is a schematic plan structural view of the child safety seat shown in FIG. 3 when viewed from back to front.
Figure 7:
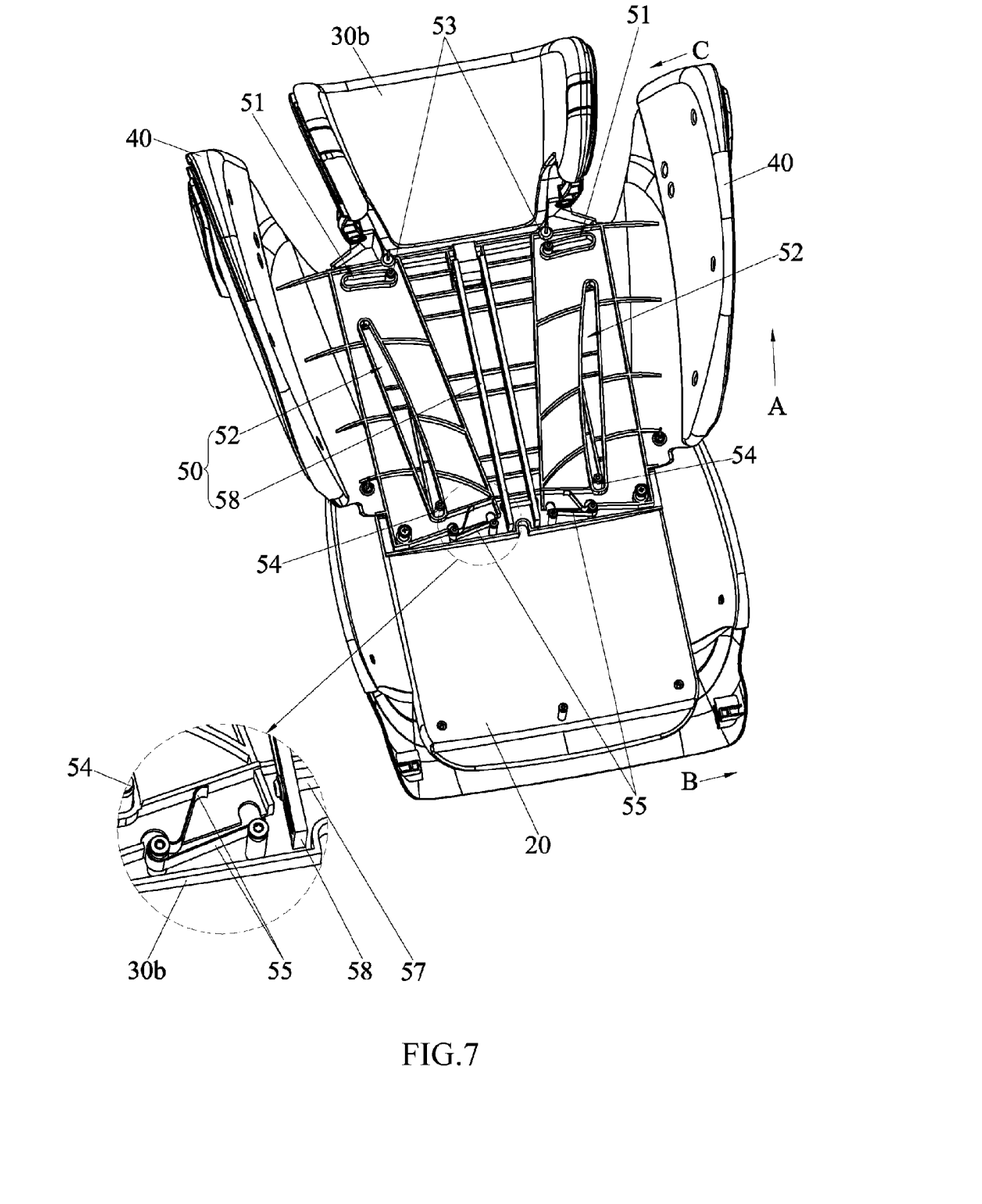
FIG. 7 is a schematic perspective structural view of the child safety seat shown in FIG. 3 after a first backrest is partially hidden.

Referring to FIG. 1, a child safety seat 100 of the present disclosure includes a base 10, a first backrest 20, a second backrest 30a, a headrest 30b, side wings 40, and a side wing height and width synchronous adjustment mechanism 50. The first backrest 20 and the second backrest 30a are slidably connected to each other along a height direction of the child safety seat 100 (i.e., a direction indicated by an arrow A), such that the second backrest 30a can be slidably adjusted with respect to the first backrest 20 along the height direction of the child safety seat 100. The headrest 30b is assembled on the second backrest 30a, and, together with the second backrest 30a, forms an adjustor 30 for performing a height adjustment with respect to the first backrest 20, such that the height of the headrest 30b can be adjusted along with the second backrest 30a with respect to the first backrest 20. The side wings 40 are respectively located on two opposite sides (e.g., left and right sides) of the first backrest 20, such that one side wing 40 is provided on each of the left and right sides of the first backrest 20, and the width of the child safety seat 100 of the present disclosure can be adjusted by adjusting the left and right side wings 40 with respect to each other. Specifically, with reference to FIGS. 2 to 5 and 8, in order to improve the stability and reliability of sliding the second backrest 30a with respect to the first backrest 20, the first backrest 20 is provided with height guiding tracks 21, and the second backrest 30a is provided with fitting guide structures 31 which are in sliding fit with the height guiding tracks 21. Preferably, either the height guiding tracks 21 or the fitting guide structures 31 are arranged on the child safety seat 100 as one on the left and the other on the right, so as to increase the reliability of the slidable connection between the second backrest 30a and the first backrest 20. For example, the height guiding track 21 may be a straight slotted hole, and the fitting guide structure 31 may be a pin shaft arranged to pass through the straight slotted hole, but the present disclosure is not limited thereto. It can be understood, according to actual requirements, the height guiding tracks 21 may be arranged on the second backrest 30a, and correspondingly, the fitting guide structures 31 may be arranged on the first backrest 20, which can also realize mutual guidance of the height guiding tracks 21 and the fitting guide structures 31. More specifically:

As shown in FIGS. 4 to 9, the side wings 40 are embedded in the adjustor 30, such that the side wings 40 are limited in the adjustor 30 along a front-rear direction of the child safety seat 100, and the adjustor 30 prevents the side wings 40 from swaying in front-rear direction of the child safety seat 100. The adjustor 30 is embedded in the first backrest 20, such that the adjustor 30 is limited in the first backrest 20 along the front-rear direction of the child safety seat 100. The second backrest 30a is provided with avoidance spaces 32 for second fitting guide members 54 (which will be described below) to pass through, so as to provide an avoidance position for the second fitting guide members 54 to slide on second guide rails 52 (which will be described below). Specifically, as shown in FIGS. 4, 6 and 7, in the adjustor 30, the second backrest 30a and the headrest 30b are arranged in parallel along the front-rear direction, and the side wings 40 are positioned between the second backrest 30a and the headrest 30b in the front-rear direction of the child safety seat 100, so as to facilitate the assembling operation of the second backrest 30a, the headrest 30b and the side wings 40, but the present disclosure is not limited thereto.

Figure 2:
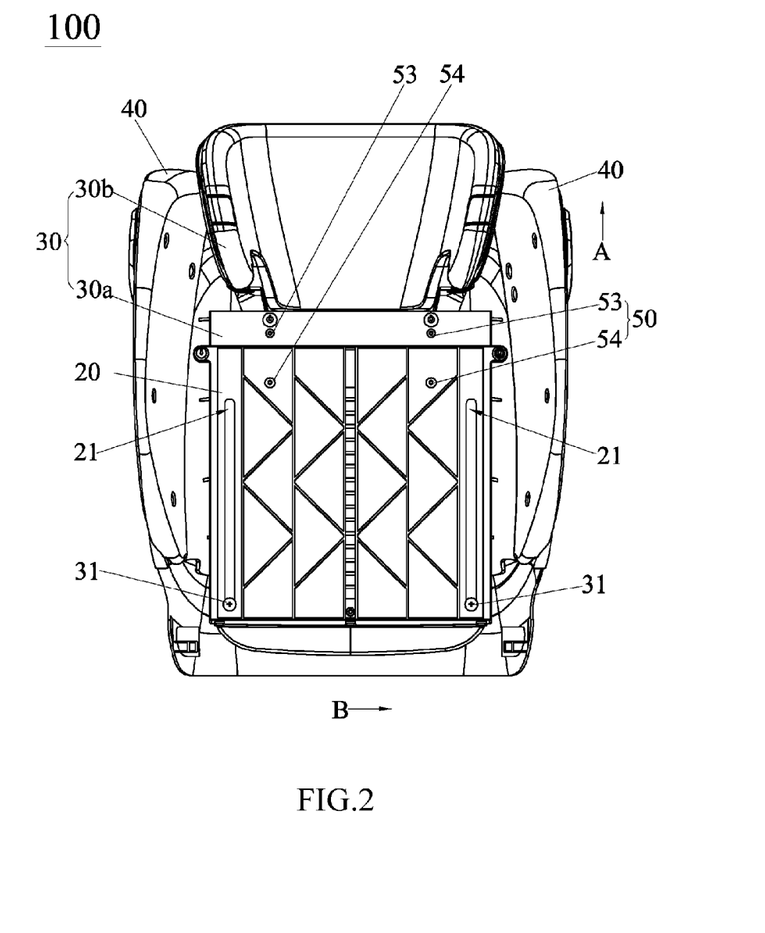
FIG. 2 is a schematic plan structural view of the child safety seat shown in FIG. 1 after a base is hidden.
Figure 3:
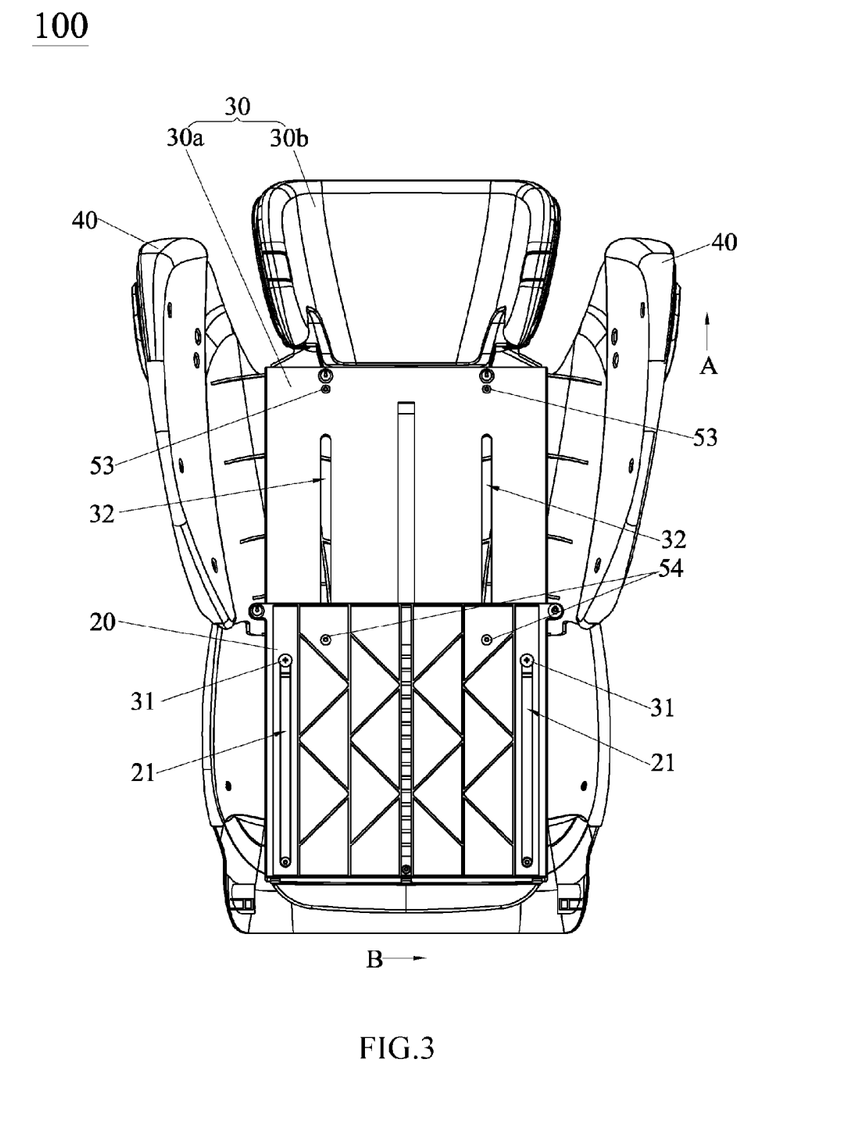
FIG. 3 is a schematic plan structural view of the child safety seat shown in FIG. 2 after being expanded outwardly.

As shown in FIGS. 4, 5, 7, 8 and 9, the side wing height and width synchronous adjustment mechanism 50 includes first guide rails 51 extending along a width direction of the child safety seat 100 (i.e., indicated by an arrow B), second guide rails 52 extending along the height direction of the child safety seat 100, first fitting guide members 53 in sliding-fit with the first guide rails 51, and second fitting guide members 54 in sliding-fit with the second guide rails 52. The first guide rails 51 are arranged on the side wings 40, and the first fitting guide members 53 are arranged on the adjustor 30 (specifically, on the second backrest 30a of the adjustor 30). Of course, the first fitting guide members 53 may be arranged on the side wings 40 according to actual requirements, and correspondingly, the first guide rails 51 may be arranged on the adjustor 30, which is not limited by the present disclosure. The second guide rails 52 are arranged on the side wings 40, and the second fitting guide members 54 are arranged on the first backrest 20. Of course, the second fitting guide members 54 may be arranged on the side wings 40 according to actual requirements, and correspondingly, the second guide rails 52 may be arranged on the first backrest 20, which is not limited by the present disclosure. During the height adjustment of the headrest 30b, the height and width of the side wings 40 are synchronously adjusted in a linkage manner by means of the first fitting guide members 53 sliding on the first guide rails 51 and the second fitting guide members 54 sliding on the second guide rails 52 simultaneously, such that the adjusted state of the side wings 40 and the headrest 30b is shown in FIGS. 3 and 4, and the unadjusted state of the side wings 40 and the headrest 30b is shown in FIGS. 1 and 2. Specifically, the side wings 40 are translated and rotated to open outwardly or contract inwardly with respect to the first backrest 20 under the action of sliding the first fitting guide members 53 along the first guide rails 51 and sliding the second fitting guide members 54 along the second guide rails 52 simultaneously, such that the height and width of the side wings 40 can be adjusted more smoothly, and the space occupied during the adjustment is smaller. For example, the first guide rail 51 is a first curved slotted hole, and the first fitting guide member 53 is arranged to pass through the first curved slotted hole and slides in the first curved slotted hole along an extending direction of the first curved slotted hole. Preferably, the first curved slotted hole is an upwardly protruding arc slotted hole, and the first fitting guide member 53 is a pin shaft. Meanwhile, the second guide rail 52 is a second curved slotted hole, and the second fitting guide member 54 is arranged to pass through the second curved slotted hole and slide in the second curved slotted hole along an extending direction of the second curved slotted hole. Preferably, the second curved slotted hole is an arc slotted hole which is gradually expands outward from bottom to top, and the second fitting guide member 54 is a pin shaft, such that the side wings 40 can be translated and rotated more smoothly to open inwardly or contract inwardly with respect to the first backrest 20 under the action of sliding the first fitting guide member 53 on the first guide rail 51 and sliding the second fitting guide member 54 on the second guide rail 52 simultaneously, but the present disclosure is not limited thereto. In order to make the side wings 40 constantly have a tendency to open outwardly under normal conditions, for example, in FIGS. 7, 9, and 10, the side wing height and width synchronous adjustment mechanism 50 further includes side wing reset members 55 which constantly drives the side wings 40 to open outwardly with respect to the first backrest 20, and the side wing reset members 55 are arranged between the side wings 40 and the adjustor 30. Specifically, the side wing reset member 55 is an elastic member, such as a torsion spring shown in FIGS. 7, 9, and 10. Of course, the side wing reset member 55 can be selected as a compression spring or an extension spring according to actual requirements, as long as an assembly position of the side wing reset members 55 is ensured to constantly drive the side wings 40 to open outwardly with respect to the first backrest 20. Of course, according to actual requirements, the side wing reset members 55 can constantly have a tendency to drive the side wings 40 to contract inwardly with respect to the first backrest 20. It can be understood that, no matter whether the side wing reset members 55 have a tendency to drive the side wings 40 to open outwardly or contract inwardly with respect to the first backrest 20, the side wing reset members 55 can be torsion springs, compression springs, or extension springs. Of course, according to actual requirements, the side wing reset member 55 may also include first and second magnetic structures attracting or repelling each other. At this time, the first magnetic structure is mounted on the side wing 40, and the second magnetic structure is mounted on the adjustor 30, preferably on the headrest 30b of the adjustor 30, so as to achieve the ability to open outwardly or contract inwardly by magnetic attraction or repulsion, but the present disclosure is not limited to the above examples.

Figure 8:
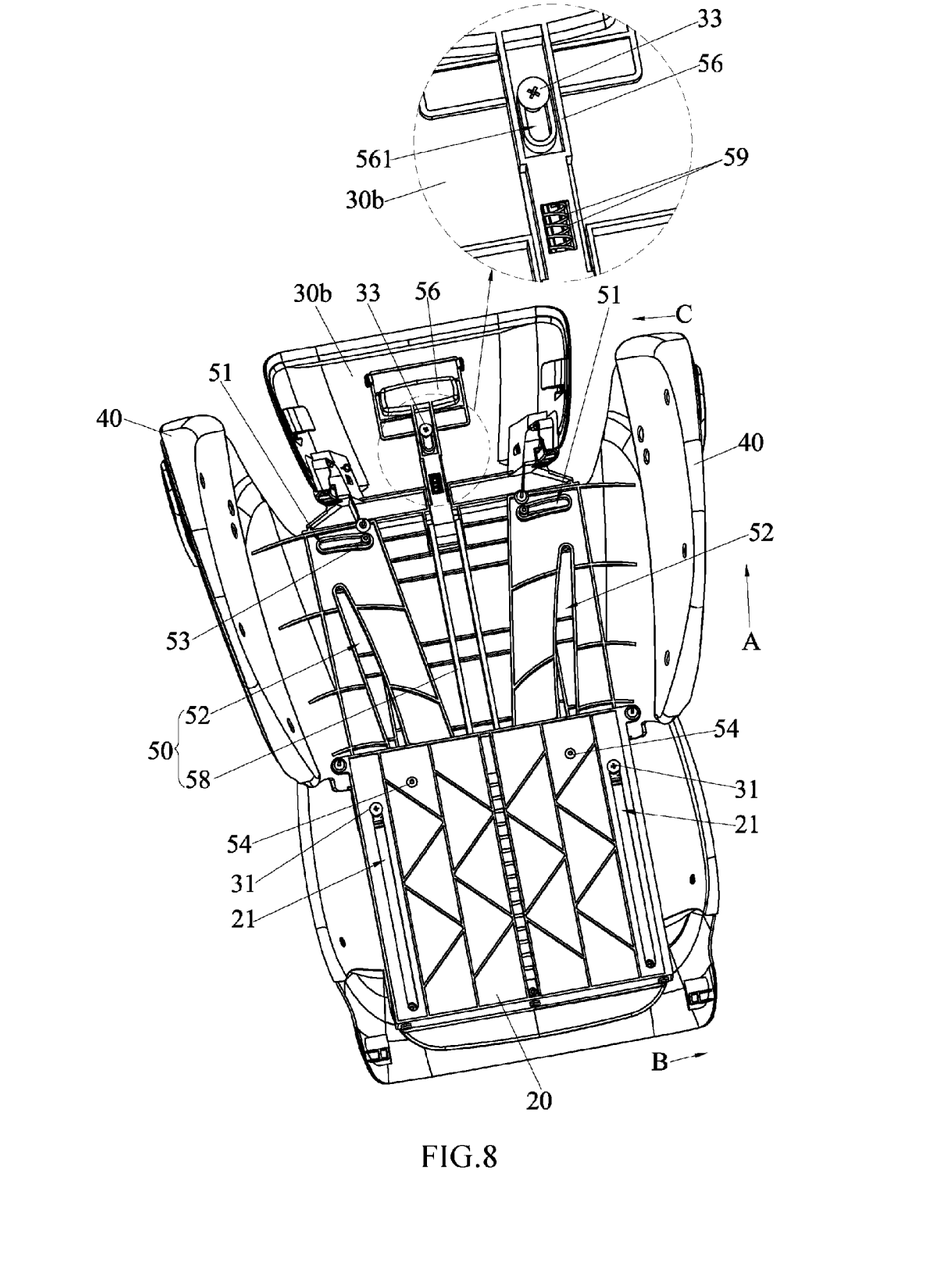
FIG. 8 is a schematic perspective structural view of the child safety seat shown in FIG. 3 after a headrest is partially hidden.
Figure 9:
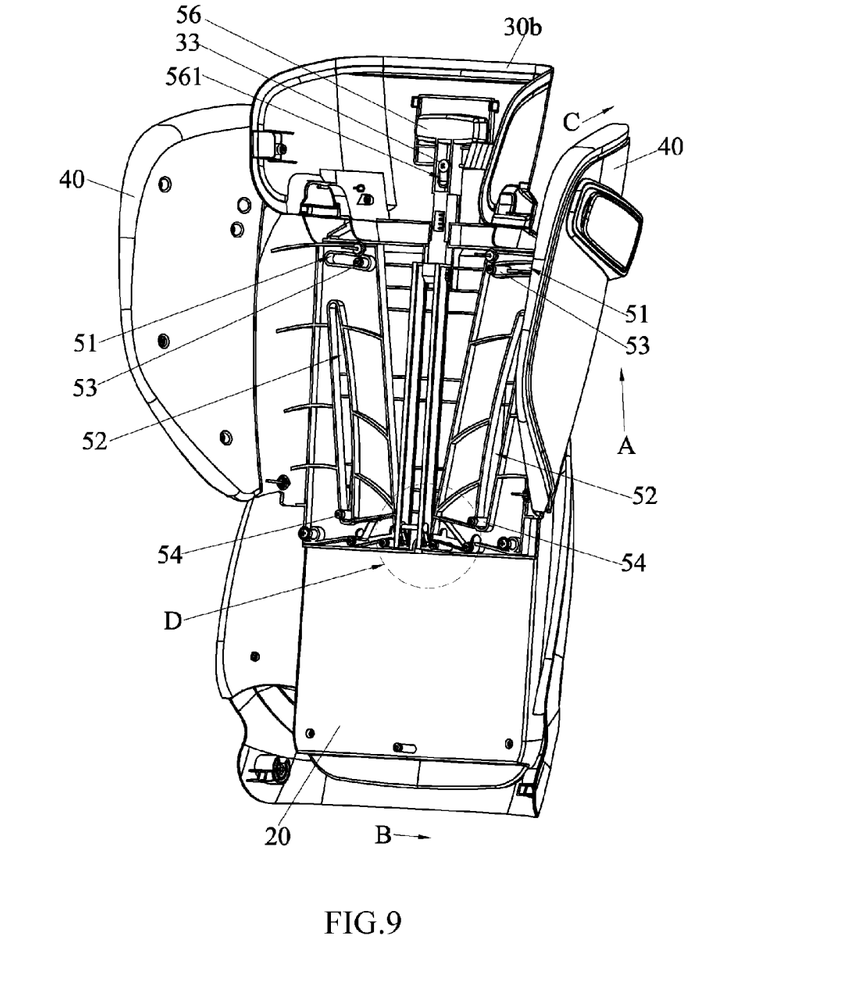
FIG. 9 is a schematic perspective structural view of the child safety seat shown in FIG. 3 after both the first backrest and the headrest are partially hidden.

As shown in FIGS. 6 and 8-11, the side wing height and width synchronous adjustment mechanism 50 further includes an unlocking operating member 56 and a locking member 57 linked with the unlocking operating member 56. The locking member 57 is movably assembled on the adjustor 30. Preferably, the locking member 57 can be slidably mounted on the second backrest 30a of the adjustor 30 along the front-rear direction of the child safety seat 100, and the first backrest 20 is provided with sixteen segment locking parts 221 spaced apart from each other along the height direction of the child safety seat 100. Of course, two, three, four, five or six segment locking parts 221 can be provided according to actual requirements, and the present disclosure is not limited thereto. The locking member 57 locks the height adjustment of the adjustor 30 with respect to the first backrest 20 when it is locked with any one of the segment locking parts 221, that is, blocks the height adjustment of the adjustor 30 with respect to the first backrest 20. The adjustor 30 can perform the height adjustment with respect to the first backrest 20 when the locking member 57 is unlocked with any one of the segment locking parts 221, so as to allow the height adjustment of the adjustor 30 with respect to the first backrest 20, thus preventing the adjusted headrest 30b from accidentally moving by means of cooperation of the locking member 57 and the segment locking parts 221. Specifically, for example, as shown in FIGS. 7 to 9, in order to realize a remote operation of the locking member 57, the side wing height and width synchronous adjustment mechanism 50 further includes an intermediate linking member 58. The intermediate linking member 58 is arranged between the unlocking operating member 56 and the locking member 57, such that the unlocking operating member 56 is linked with the locking member 57 through the intermediate linking member 58 to unlock the locking member 57 from any one of the segment locking parts 221. Preferably, the locking member 57 extends along the width direction of the child safety seat 100, and the intermediate linking member 58 extends along the height direction of the child safety seat 10. The locking member 57 is linked by the intermediate linking member 58 to slide along the front-rear direction of the child safety seat 100 (i.e., indicated by an arrow C), such that it is easier to lock or unlock the locking member 57 with any one of the segment locking parts 221. More specifically, for example, in FIG. 10, the intermediate linking member 58 has an inclined structure 581 which is inclined from front to back with respect to the height direction of the child safety seat 100. In the process of sliding along the height direction of the child safety seat 100, the intermediate linking member 58 is linked with the locking member 57 through the inclined structure 581 to perform a frontward or backward displacement for unlocking the locking member 57 with any one of the segment locking parts 221, such that the locking member 57 can be more reliably unlocked with any one of the segment locking parts 221. In order to make linking of the intermediate linking member 58 and the locking member 57 more reliable, for example, in FIG. 10, the intermediate linking member 58 is provided with a driving chute 58a which is elongated and inclined from front to back with respect to the height direction of the child safety seat 100. The driving chute 58a penetrates through the intermediate linking member 58 from a left side to a right side. The locking member 57 is arranged to pass through the driving chute 58a and can slide in the driving chute 58a. The inclined structure 581 is formed on an upper groove wall and/or a lower groove wall of the driving chute 58a.

Figure 11:
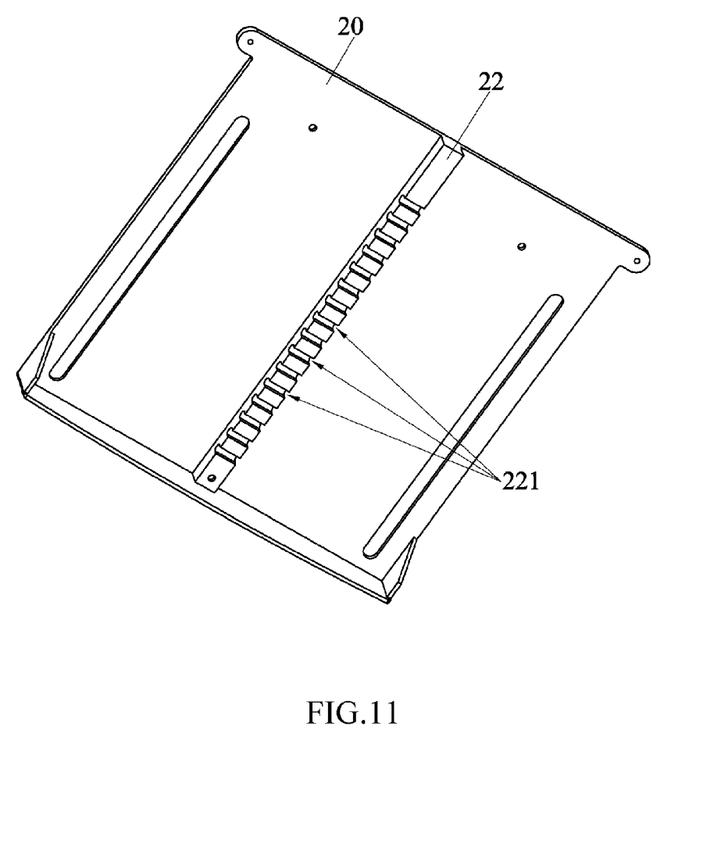
FIG. 11 is a schematic perspective structural view of a part of the first backrest of the child safety seat of the present disclosure when viewed from back to front.

As shown in FIG. 11, in order to make locking of the locking member 57 with the first backrest 20 more reliable, the first backrest 20, on which the segment locking parts 221 are positioned, protrudes outwardly to form a protruding strip 22 extending along the height direction of the child safety seat 100. The segment locking parts 221 are formed on the protruding strip 22, and correspondingly, the intermediate linking member 58 is provided with an avoidance space 582 extending along the height direction of the child safety seat 100, and the protruding strip 22 is positioned within the avoidance space 582. For example, the locking member 57 is a bar or a pin shaft, the segment locking part 221 is a slotted hole structure, but the present disclosure is not limited thereto. It can be understood, when the segment locking parts 221 are provided by the second backrest 30a of the adjustor 30, the protruding strip 22 is provided by the second backrest 30a.

As shown in FIG. 6, the unlocking operating member 56 is positioned on the headrest 30b. Of course, the unlocking operating member 56 may be positioned on the second backrest 30a according to actual requirements. Specifically, the unlocking operating member 56 may be slidably arranged along the height direction of the child safety seat 100, and the unlocking operating member 56 is exposed from the rear side of the headrest 30b, so as to facilitate the operator to perform a pulling/lifting operation on the unlocking operating member 56 from the rear. Of course, the unlocking operating member 56 is exposed from the rear side of the second backrest 30a according to actual requirements. More specifically, as shown in FIG. 8, the side wing height and width synchronous adjustment mechanism 50 further includes an unlocking reset member 59, and the unlocking reset member 59 is arranged between the unlocking operating member 56 and the headrest 30b on which the unlocking operating member 56 is positioned. The unlocking reset member 59 constantly has a tendency to drive the unlocking operating member 56 to move to an initial position, so as to facilitate the automatic reset of the unlocking operating member 56. For example, the unlocking reset member 59 is an elastic member, such as, but not limited to, a compression spring. Of course, according to actual requirements, the unlocking reset member 59 may also include a first magnetic structure and a second magnetic structure that attract or repel each other. The first magnetic structure is mounted on the headrest 30b, and the second magnetic structure is mounted on the unlocking operating member 56, which can also realize the automatic reset of the unlocking operating member 56.

As shown in FIGS. 8 and 9, in order to prevent the unlocking operating member 56 from being reset excessively, the unlocking operating member 56 is provided with a limiting slotted hole 561 extending along the height direction of the child safety seat 100, and the headrest 30b is provided with a limiting lug 33 arranged to pass through the limiting slotted hole 561. The limiting lug 33 is abutted against an end of the limiting slotted hole 561, such as an upper end of the limiting slotted hole 561 as shown in FIG. 8, under the action of the unlocking reset member 59, but the present disclosure is not limited thereto. It should be noted that, the limiting slotted hole 561 may be provided by the headrest 30b, and the limiting lug 33 may be provided by the unlocking operating member 56, which can achieve the purpose of limiting, which is not limited by the present disclosure.

Figure 10:
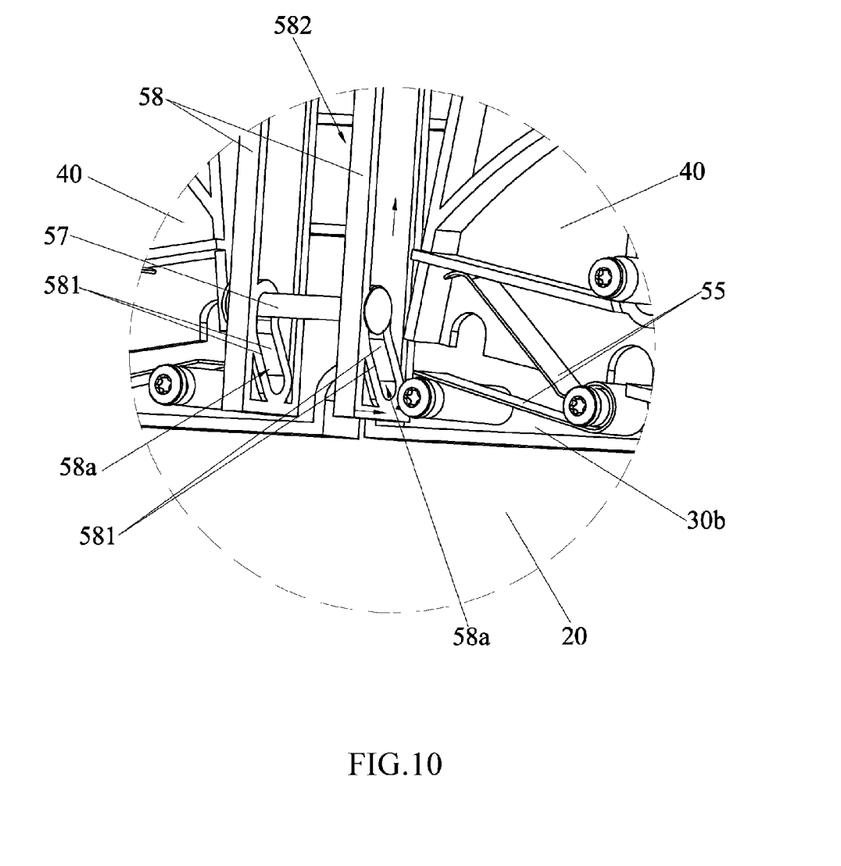
FIG. 10 is an enlarged view of part D in FIG. 9.

Referring to the drawings, the principle that the height and width adjustment of the side wings 40 can be realized by linking with the height adjustment of the headrest 30b of the child safety seat according to the present disclosure will be explained: when the state of the headrest 30b and the side wings 40 shown in FIG. 2 is to be adjusted to the state shown in FIG. 3, 4 or 5, the operator lifts up the unlocking operating member 56 shown in FIG. 6, and the unlocking operating member 56 brings the intermediate linking member 58 to slide upwardly, such that the upwardly sliding intermediate linking member 58 pushes the locking member 57 by the inclined structure 581 to slide backward (a sliding direction of the locking member 57 is indicated by an arrow shown at a lower part of the intermediate linking member 58 in FIG. 10, and a sliding direction of the intermediate linking member 58 is indicated by an arrow shown at an upper part of the intermediate linking member 58 in FIG. 10), unlocking the backwardly sliding locking member 57 with any one of the segment locking parts 221 of the first backrest 20 shown in FIG. 11. At this time, the operator pulls the headrest 30b upwardly while keeping lifting up the unlocking operating member 57, such that the headrest 30b and the second backrest 30a together perform a height adjustment with respect to the first backrest 20. During the height adjustment of the headrest 30b, the first fitting guide members 53 slide on the first guide rails 51 and the second fitting guide members 54 slide on the second guide rails 52, such that the height adjustment and width adjustment of the side wings 40 are synchronously performed during the height adjustment of the headrest 30b, and the height and width synchronous adjustment of the side wings 40 can be realized along with the height adjustment of the headrest 30b, the state thereof is shown in FIG. 3, 4 or 5.

Compared with the prior art, the side wing height and width synchronous adjustment mechanism 50 of the present disclosure includes first guide rails 51 extending along the width direction of the child safety seat 100, second guide rails 52 extending along the height direction of the child safety seat 100, first fitting guide members 53 are in sliding-fit with the first guide rails 51, and second fitting guide members 54 are in sliding-fit with the second guide rails 52, the first guide rail 51 is arranged on one of the first backrest 20 and the second backrest 30a, and the first fitting guide member 53 is arranged on the other one of the first backrest 20 and the second backrest 30a, the second guide rail 52 is arranged on the first backrest 20 or one of the side wings 40, and the second fitting guide member 54 is arranged on the one of the side wings 40 or the first backrest 20; during the height adjustment of the headrest 30b, the height and width of the side wing 40 are synchronously adjusted in a linkage manner by means of the first fitting guide member 53 sliding on the first guide rail 51 and the second fitting guide member 54 sliding on the second guide rail 52, so as to achieve synchronous adjustment of the height and width of the side wing 40 along with the height adjustment of the headrest 30b, thereby achieving better universality and comfort.

Preferred embodiments have been provided by the present disclosure, which of course should not be intended to limit the scope of the present disclosure. Therefore, all changes falling within the scope of the present disclosure should be covered by the present disclosure.

what is claimed is:

1. A side wing height and width synchronous adjustment mechanism arranged on a child safety seat, the child safety seat comprising a first backrest, a second backrest, a headrest, and side wings, the first backrest and the second backrest being slidably connected to each other along a height direction of the child safety seat, the headrest being assembled on the second backrest and, together with the second backrest, forming an adjustor for performing a height adjustment with respect to the first backrest, the side wings being located on sides of the first backrest, wherein the side wing height and width synchronous adjustment mechanism comprises a first guide rail extending in a width direction of the child safety seat, a second guide rail extending in the height direction of the child safety seat, a first fitting guide member in sliding-fit with the first guide rail, and a second fitting guide member in sliding-fit with the second guide rail, the first guide rail is arranged on one of the side wings or the adjustor, the first fitting guide member is arranged on the adjuster or the one of the side wings, the second guide rail is arranged on the first backrest or one of the side wings, and the second fitting guide member is arranged on the one of the side wings or the first backrest; wherein during the height adjustment of the headrest, a height and a width of the side wings are synchronously adjusted in a linkage manner by means of the first fitting guide member sliding on the first guide rail and the second fitting guide member sliding on the second guide rail, wherein the side wings are translated and rotated to open outwardly or contract inwardly with respect to the first backrest under an action of sliding the first fitting guide member along the first guide rail and sliding the second fitting guide member along the second guide rail simultaneously.

2. The side wing height and width synchronous adjustment mechanism according to claim 1, wherein the first guide rail is a first curved slotted hole, and the first fitting guide member is arranged to pass through the first curved slotted hole and slidable in the first curved slotted hole along an extending direction of the first curved slotted hole.

3. The side wing height and width synchronous adjustment mechanism according to claim 2, wherein the first curved slotted hole is an upwardly protruding arc slotted hole, and the first fitting guide member is a pin shaft.

4. The side wing height and width synchronous adjustment mechanism according to claim 1, wherein the second guide rail is a second curved slotted hole, the second fitting guide member is arranged to pass through the second curved slotted hole and slidable in the second curved slotted hole along an extending direction of the second curved slotted hole.

5. The side wing height and width synchronous adjustment mechanism according to claim 4, wherein the second curved slotted hole is an arc slotted hole gradually expanding outward from bottom to top, and the second fitting guide member is a pin shaft.

6. The side wing height and width synchronous adjustment mechanism according to claim 1, further comprising side wing reset members constantly driving the side wings to open outwardly or contract inwardly with respect to the first backrest, and each of the side wing reset members is arranged between one of the side wings and the adjustor, respectively.

7. The side wing height and width synchronous adjustment mechanism according to claim 6, wherein each of the side wing reset members is an elastic member.

8. The side wing height and width synchronous adjustment mechanism according to claim 7, wherein the elastic member is a torsion spring, a compression spring, or an extension spring.

9. The side wing height and width synchronous adjustment mechanism according to claim 6, wherein each of the side wing reset members comprises a first magnetic structure and a second magnetic structure that attract or repel each other, the first magnetic structure is mounted on one of the side wings, and the second magnetic structure is mounted on the adjustor.

10. The side wing height and width synchronous adjustment mechanism according to claim 1, further comprising an unlocking operating member and a locking member linked with the unlocking operating member, the locking member is movably assembled on one of the first backrest and the adjustor, the other one of the first backrest and the adjustor is provided with at least two segment locking parts that are spaced apart from each other along the height direction of the child safety seat, the locking member locks the height adjustment of the adjustor with respect to the first backrest when it is locked with any one of the segment locking parts, the adjustor is able to perform the height adjustment with respect to the first backrest when the locking member is unlocked with any one of the segment locking parts.

11. The side wing height and width synchronous adjustment mechanism according to claim 10, further comprising an intermediate linking member, the intermediate linking member is arranged between the unlocking operating member and the locking member, and the unlocking operating member is linked with the locking member through the intermediate linking member to unlock the locking member from any one of the segment locking parts.

12. The side wing height and width synchronous adjustment mechanism according to claim 11, wherein the locking member extends along the width direction of the child safety seat, and the intermediate linking member extends along the height direction of the child safety seat.

13. The side wing height and width synchronous adjustment mechanism according to claim 12, wherein the intermediate linking member has an inclined structure inclined from front to back with respect to the height direction of the child safety seat, and in a process of sliding along the height direction of the child safety seat, the intermediate linking member is linked with the locking member through the inclined structure to perform a frontward or backward displacement for unlocking the locking member with any one of the segment locking parts.

14. The side wing height and width synchronous adjustment mechanism according to claim 12, wherein the first backrest, on which the segment locking parts are positioned, or the adjustor protrudes outwardly to form a protruding strip extending along the height direction of the child safety seat, and the segment locking parts are formed on the protruding strip.

15. The side wing height and width synchronous adjustment mechanism according to claim 14, wherein the intermediate linking member is provided with an avoidance space extending along the height direction of the child safety seat, and the protruding strip is positioned within the avoidance space.

16. The side wing height and width synchronous adjustment mechanism according to claim 13, wherein the intermediate linking member is provided with a driving chute which is elongated and inclined from front to back with respect to the height direction of the child safety seat, the driving chute penetrates through the intermediate linking member from a left side to a right side, the locking member is arranged to pass through the driving chute and is slidable in the driving chute, and the inclined structure is formed on an upper groove wall and/or a lower groove wall of the driving chute.

17. The side wing height and width synchronous adjustment mechanism according to claim 10, wherein the locking member is a bar or a pin shaft, each one of the segment locking parts is a slotted hole structure.

18. The side wing height and width synchronous adjustment mechanism according to claim 10, wherein the unlocking operating member is positioned on the second backrest or the headrest.

19. The side wing height and width synchronous adjustment mechanism according to claim 18, further comprising an unlocking reset member arranged between the unlocking operating member and the second backrest or the headrest on which the unlocking operating member is positioned, the unlocking reset member constantly having a tendency to drive the unlocking operating member to move to an initial position.

20. The side wing height and width synchronous adjustment mechanism according to claim 19, wherein the unlocking reset member is an elastic member; or the unlocking reset member comprises a first magnetic structure and a second magnetic structure that attract or repel each other, the first magnetic structure is mounted on the headrest, and the second magnetic structure is mounted on the unlocking operating member.

21. The side wing height and width synchronous adjustment mechanism according to claim 18, wherein the unlocking operating member is slidably arranged along the height direction of the child safety seat, and the unlocking operating member is exposed from a rear side of the second backrest or the headrest.

22. The side wing height and width synchronous adjustment mechanism according to claim 18, wherein one of the unlocking operating member and the headrest is provided with a limiting slotted hole extending along the height direction of the child safety seat, the other one of the unlocking operating member and the headrest is provided with a limiting lug arranged to pass through the limiting slotted hole, the limiting lug is abutted against an end of the limiting slotted hole under an action of an unlocking reset member.

23. A child safety seat comprising a base, a first backrest, a second backrest, a headrest, and side wings, the first backrest and the second backrest being slidably connected to each other along a height direction of the child safety seat, the headrest being assembled on the second backrest and, together with the second backrest, forming an adjustor for performing a height adjustment with respect to the first backrest, and the side wings being respectively located on two opposite sides of the first backrest, wherein the child safety seat further comprises a side wing height and width synchronous adjustment mechanism, wherein the side wing height and width synchronous adjustment mechanism comprises a first guide rail extending in a width direction of the child safety seat, a second guide rail extending in the height direction of the child safety seat, a first fitting guide member in sliding-fit with the first guide rail, and a second fitting guide member in sliding-fit with the second guide rail, the first guide rail is arranged on one of the side wings or the adjustor, the first fitting guide member is arranged on the adjuster or the one of the side wings, the second guide rail is arranged on the first backrest or one of the side wings, and the second fitting guide member is arranged on the one of the side wings or the first backrest; wherein during the height adjustment of the headrest, a height and a width of the side wings are synchronously adjusted in a linkage manner by means of the first fitting guide member sliding on the first guide rail and the second fitting guide member sliding on the second guide rail, wherein the side wings are translated and rotated to open outwardly or contract inwardly with respect to the first backrest under an action of sliding the first fitting guide member along the first guide rail and sliding the second fitting guide member along the second guide rail simultaneously.

24. The child safety seat according to claim 23, wherein one of the first backrest and the second backrest is provided with a height guiding track, and the other one of the first backrest and the second backrest is provided with a fitting guide structure in sliding-fit with the height guiding track.

25. The child safety seat according to claim 24, wherein the height guiding track is a straight slotted hole, and the fitting guide structure is a pin shaft arranged to pass through the straight slotted hole.

26. The child safety seat according to claim 23, wherein the side wings are embedded in the adjustor, the adjustor is embedded in the first backrest, and the second backrest is provided with an avoidance space for the second fitting guide member to pass through.

* * * * *